(12) United States Patent
Andueza et al.

(10) Patent No.: US 10,975,652 B2
(45) Date of Patent: Apr. 13, 2021

(54) HYDRAULIC CONNECTOR AND PROCESS FOR PERFORMING HYDRAULIC CONNECTION

(71) Applicant: FMC TECHNOLOGIES DO BRASIL LTDA, Rio de Janeiro (BR)

(72) Inventors: Alejandro Andueza, Rio de Janeiro (BR); Marcos Cantu Mannarino, Rio de Janeiro (BR); Fernando da Silva Rodrigues, Rio de Janeiro (BR); Guilherme Sousa Moura, Rio de Janeiro (BR)

(*) Notice: Subject to any disclaimer, the term of this patent is extended or adjusted under 35 U.S.C. 154(b) by 0 days.

(21) Appl. No.: 16/606,646

(22) PCT Filed: Apr. 17, 2018

(86) PCT No.: PCT/BR2018/050113
§ 371 (c)(1),
(2) Date: Oct. 18, 2019

(87) PCT Pub. No.: WO2018/191803
PCT Pub. Date: Oct. 25, 2018

(65) Prior Publication Data
US 2020/0056439 A1    Feb. 20, 2020

(30) Foreign Application Priority Data
Apr. 18, 2017    (BR) .......................... 1020170080102

(51) Int. Cl.
*E21B 33/038*    (2006.01)
*E21B 43/01*    (2006.01)
(Continued)

(52) U.S. Cl.
CPC ............ *E21B 33/038* (2013.01); *E21B 43/01* (2013.01); *E21B 33/12* (2013.01); *E21B 2200/01* (2020.05); *F16L 37/084* (2013.01); *F16L 37/62* (2013.01)

(58) Field of Classification Search
CPC .... E21B 33/038; E21B 43/01; E21B 2200/01; E21B 33/12; F16L 37/084; F16L 37/62; F16L 37/00
See application file for complete search history.

(56) References Cited

U.S. PATENT DOCUMENTS

| 1,913,030 | A | 6/1933 | Frank Hux |
| 3,096,999 | A | 7/1963 | Ahlstone et al. |

(Continued)

FOREIGN PATENT DOCUMENTS

| CA | 1224410 A | 7/1987 |
| GB | 2480571 B | 12/2011 |

(Continued)

OTHER PUBLICATIONS

International Search Report issued in PCT/BR2018/050113 dated Jul. 3, 2018 (3 pages).

(Continued)

*Primary Examiner* — James G Sayre
(74) *Attorney, Agent, or Firm* — Osha Bergman Watanabe & Burton LLP

(57) ABSTRACT

A hydraulic connector type ("Titus") may be used in oil production and extraction operations in the seabed. The hydraulic connector type ("Titus") may be able to provide a connection between cylindrical bodies such as Christmas tree and a wellhead. The hydraulic connector type ("Titus") may have a locking system including a hydraulic circuit and the unlocking system has a hydraulic circuit. Additionally, a pre-load adjustment system may be performed through an (Continued)

adjustment ring. The hydraulic connector type ("Titus") contains a set of jaws, one actuator hydraulic piston, pressurization chambers, sealing elements, external jacket, bottom cap, adjustment ring and hydraulic fluid lines.

10 Claims, 2 Drawing Sheets

(51) Int. Cl.
  *E21B 33/12* (2006.01)
  *F16L 37/084* (2006.01)
  *F16L 37/62* (2006.01)

(56) References Cited

U.S. PATENT DOCUMENTS

| | | | | |
|---|---|---|---|---|
| 3,321,217 | A | * | 5/1967 | Ahlstone ............... E21B 33/038 285/18 |
| 3,851,897 | A | | 12/1974 | Piazza et al. |
| 4,424,988 | A | | 1/1984 | Cowx |
| 4,496,172 | A | | 1/1985 | Walker |
| 4,516,795 | A | * | 5/1985 | Baugh ................... E21B 33/038 285/315 |
| 4,647,254 | A | | 3/1987 | Baugh et al. |
| 4,902,044 | A | | 2/1990 | Williams et al. |
| 6,070,669 | A | | 6/2000 | Radi et al. |
| 7,614,453 | B2 | | 11/2009 | Spiering et al. |
| 8,474,537 | B2 | | 7/2013 | Voss et al. |
| 9,169,710 | B2 | * | 10/2015 | Jahnke ................... E21B 33/038 |
| 9,650,855 | B2 | | 5/2017 | Caldwell et al. |
| 2003/0151254 | A1 | | 8/2003 | Baugh |
| 2004/0102069 | A1 | * | 5/2004 | Singeetham .......... E21B 33/038 439/157 |
| 2005/0001427 | A1 | | 1/2005 | Liew |
| 2005/0034870 | A1 | | 2/2005 | Buckle et al. |
| 2019/0085650 | A1 | | 3/2019 | Andueza |

FOREIGN PATENT DOCUMENTS

| | | | | |
|---|---|---|---|---|
| WO | WO-2010099269 | A1 | * 9/2010 | ........... E21B 33/038 |
| WO | 2012123087 | A2 | 9/2012 | |
| WO | WO-2012123087 | A2 | * 9/2012 | ......... H01R 13/6215 |
| WO | 2017147667 | A1 | 9/2017 | |

OTHER PUBLICATIONS

Written Opinion of the International Searching Authority issued in PCT/BR2018/050113 dated Jul. 3, 2018 (6 pages).
Third Party Observation submitted for International Patent Application No. PCT/BR2018/050113 on Jun. 28, 2019 (2 pages).
International Search Report issued in PCT/BR2016/050045 dated Nov. 9, 2016 (3 pages).
Written Opinion of the International Searching Authority issued in PCT/BR2016/050045 dated Nov. 9, 2016 (7 pages).
Non-final Office Action issued in U.S. Appl. No. 16/081,220, dated May 13, 2019 (11 pages).

* cited by examiner

HYDRAULIC CONNECTOR AND PROCESS FOR PERFORMING HYDRAULIC CONNECTION

FIELD OF THE INVENTION

The present invention relates to a hydraulic connector for providing connection between equipment installed on land or sea surface as well as between equipment installed in a subsea environment. More specifically, the present invention is related to a hydraulic connector for providing connection between remotely installed equipment at great depths in subsea applications for oil extraction. The hydraulic connector according to the present invention is of the Titus type which, among other applications, includes WCT (Wet Christmas Tree) connection with the underwater wellhead, VCM (Vertical Connection Module) connector with PLET (Pipeline End Termination). The present invention also relates to a process for performing a hydraulic connection using said hydraulic connector.

BACKGROUND OF THE INVENTION

Submarine hydraulic connectors have the function of making a rigid connection between two equipment and building the consequent sealing between them. The locking of the connector is accomplished by driving a hydraulic piston which, through a force transmission mechanism, generates a connector design preload required for its proper operation.

Currently there are two basic concepts of connectors. The first connector concept utilizes a parallel locking system where interference is generated through a mounting adjustment system. This interference produces the preload defined in the connector design for a proper functioning. This concept is applied to the connectors disclosed in the prior art documents CA1224410, US2003/0151254 and US2005/0001427.

The second connector concept currently used has a self-locking friction system for locking and the consequent rigid connection between two equipment. This type of connector requires fewer components and is much more dependent on friction between surfaces for applying preload of connector design. Prior art documents U.S. Pat. Nos. 4,516,795, 6,070,669, 7,614,453 and 8,474,537 disclose this type of hydraulic connector.

The third concept for connector combines self-locking through friction with parallel locking and is the object of International Patent PCT/BR2016/050045 also pertain to FMC Technologies. Such connector comprises jaws settled up and preloaded by a hydraulic piston actuated through pressurization chamber having redundancy on unlocking through secondary hydraulic piston, and pressurization chambers. Said connector still has a top split cap secured to external jacket and to connector's tip cylindrical body through a split ring whose portions are fixed each other by suitable means.

As well known to those skilled in the art, wellhead connectors are designed for connecting BOP (Blow Out Preventer) to the wellhead, either directly or indirectly via flow-line.

Typically, such connectors include an annular main body that is aligned and axially connected to the subsea wellhead. In order to design the connection, the connector is commonly provided with a cam ring moving radially due to a hydraulic actuator, usually a hydraulically actuated piston, forcing the cam ring and hence the tongs for locking or unlocking purposes.

One configuration used for connection to wellheads consisted of a generally "C" shaped clamp with a single contact surface. Subsequently, connections with H4 profiles were designed which are characterized by better distributing the stresses compared to those used with single surface.

Among examples of the prior art, we may specifically mention U.S. Pat. No. 4,496,172 which discloses a connector comprising jaws driven by a cam ring moving in parallel to the locking ring, being connected to piston rods in cylinders, for example. through an annular plate. The pistons are actuated remotely and preferably by hydraulic fluid lines.

GB2480571 also illustrates a multiteeth profile connector that scales the load by profile imposing better connection reliability and less connector wear. U.S. Pat. No. 3,096,999 exemplifies a connector with a single contact surface profile.

Other examples of connectors may differ in size, shape, number of teeth, types of hydraulic actuators, locking systems etc.

Parallel locking connectors have, among others, a major technical drawback, which is the extreme dependence on a large number of components that allow the adjustment of the pressure required for mounting the equipment, also leading to a major drawback of installation, manufacture and assembly costs. On the other hand, friction self-locking connectors have extreme dependence between the preload and the friction coefficient between the surfaces of the various connector components. In addition, the self-locking friction connector has a high sensitivity to manufacturing tolerances, making the connection susceptible to accidental unlocking, especially in the presence of vibration, obligating the connector to include a safety system in order to prevent accidental unlocking for obtaining greater reliability. This requirement for extra components generates a great technical drawback, which additionally promotes a significant increase in manufacturing, assembly costs, and consequently the cost of operation.

It is therefore the main object of the present invention to provide a hydraulic connector, notably for wellhead application in oil production and extraction operations, notably in the subsea bed, which advantageously solves the above mentioned technical drawbacks and economic disadvantages.

SUMMARY OF THE INVENTION

The hydraulic connector according to the present invention is of the "Titus" type and has parallel locking characteristics, but with lower amount of components compared to Titus and Torus connector concept, both of them well known by those skilled in the art.

The hydraulic connector of the present invention has an annular shape for wellhead application in subsea bed oil production and extraction operations, comprising parallel locking characteristics via locking and unlocking lines, and it presents a simplified pressure adjustment system when compared to, e.g., a Titus type connector.

In a constructive variant, the connector according to the present invention may have an optional secondary hydraulic unlocking.

The connector according to the present invention, when compared to Torus connector, presents as major technical advantage the removal of all springs and pins used in the previous connector. Such feature implies in a significant reduction in number of equipment components, with major lowering in manufacturing and assembling costs.

BRIEF DESCRIPTION OF THE DRAWINGS

Hydraulic connector according to the present invention may be better understood along with the description of attached figures which illustrates, in a non limitative schematic way one example for basic configuration of its structure. Therefore.

DETAILED DESCRIPTION OF THE INVENTION

Figure 1:
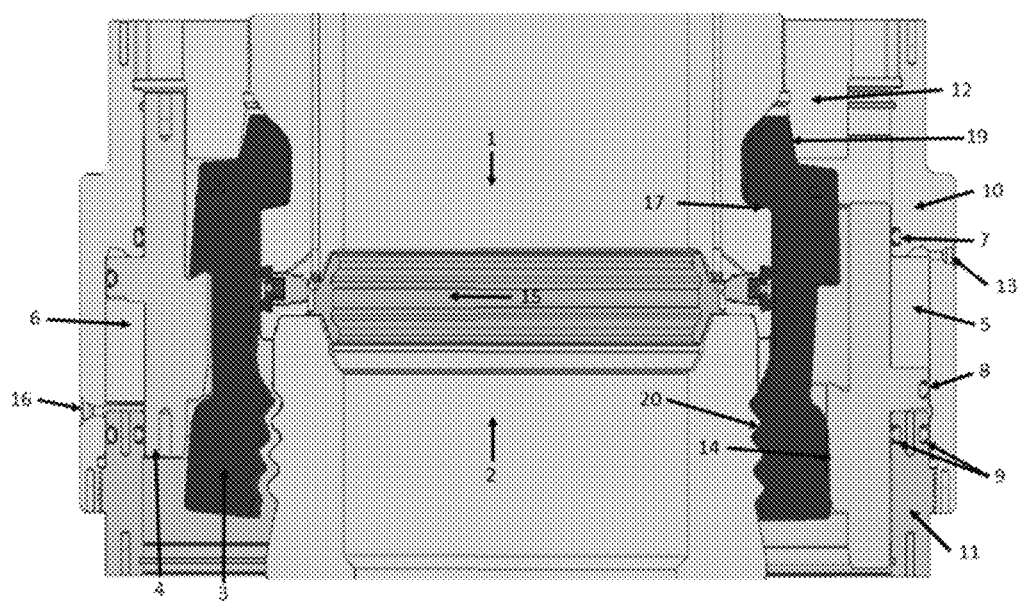
FIG. 1 illustrates detailed view of internal components from a first building way for hydraulic connector according to the present invention in locked/unlocked positions.
Figure 2:
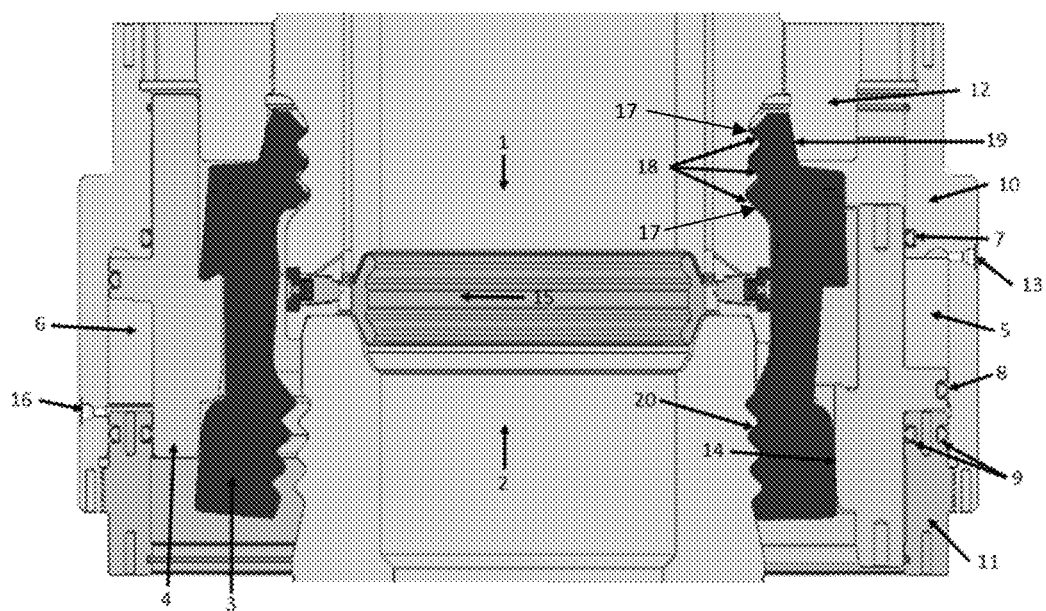
FIG. 2 illustrates detailed view of internal components from a second building way for hydraulic connector according to the present invention in locked/unlocked positions.

FIGS. 1 and 2 are exemplary embodiments of hydraulic connector which is the object of the present invention. In such figures is noted, on the right side, the connector in locked position and, on the left side, the connector in unlocked position. Since it is an equipment perfectly symmetrical (unless the jaws) against its longitudinal axis, number references apparent on one side of the figures may be not apparent on the other side, since they are the same elements.

In a first embodiment of the hydraulic connector of the present invention, illustrated in FIG. 1, it can be seen its use for providing connection between two cylindrical bodies (1) and (2). Said hydraulic connector comprises jaws (3) located and preloaded by a actuator hydraulic piston (4) through pressurization chamber (5). Pressurization chambers (5) and (6) are settled through sealing elements (7, 8 and 9), by piston (4), external jacket (10) and bottom cap (11). Cylindrical body (1) and jaws (3) show, in this embodiment example, only one contact surface (17) for transferring connection preload. The jaw (3) confines connection preload with forces present between contact surface (17) and H4 profile (20). The actuator piston (4) maintains preload force by means radial contact of surface (14).

FIG. 2 illustrates a second embodiment example of hydraulic connector according to the present invention. In relation to the configuration described for FIG. 1, hydraulic connector has as main difference the number of contact surfaces (17) between cylindrical body (1) and jaws (3). In this embodiment, jaws (3) have three teeth (18) for transferring preload. The number of teeth (18) may be two or four or even more, which affects only the load capacity of connector. Connector topology as well as its functions are the same for both embodiments presented in FIGS. 1 and 2.

The adjustment ring (12) works for allowing preload regulation of hydraulic connector design, removing the requirement for use the strict manufacturing tolerances and therefore lowering the equipment manufacturing cost. The load transference between jaws (3) and adjustment ring (12) occurs through contact surface (19). One important characteristic of connector according to the present invention consists of presenting low stress levels in all threads, granting to it excellent fatigue resistance when compared to the prior art Torus connector.

The process for making a hydraulic connection with the connector according to the present invention comprises locking the hydraulic connector together with applying the specified preload, through hydraulic locking fluid lines (13) from from any source. This hydraulic fluid line (13) pressurizes the chamber (5) by actuating the locking piston (4). The locking piston (4), which has cylindrical faces (14), is then forced in vertical downward movement causing the interference of said cylindrical faces (14) with the internal diameters of the jaws (3) in the region, moving the jaws (3) in the radial direction so as to make the connection between the surfaces of the cylindrical bodies (1) and (2) thereby preloading the connection, being the loading confined between surfaces (17) or (18) and H4 profile. After locking the connector the hydraulic pressure is removed and the equipment is locked without the need for further external forces. During the connector locking process, it is also obtained energization of metal sealing (15) which works for isolating the interface between cylindrical bodies (1) and (2) from external environment.

Hydraulic connector unlocking occurs by pressurizing the unlocking chamber (6) using the hydraulic fluid lines (16). This procedure forces the vertical upward movement from the piston (4) releasing the load on the jaws (3), causing the jaws (3) to move radially outwards, returning to the unlocked position.

As appreciated by those skilled in the art, the hydraulic connector according to the present invention, due the occurrence of unlocking by parallel face (14), which grants to it additional safety for avoidance of accidental unlocking in the presence of vibrations occurring naturally in the environment where it is installed.

It is further noted that the hydraulic connector object of the present invention has been designed, notably, for use in subsea equipment for rigid connection of two equipment such as wellhead, WCT, PLET, VCM, risers among others, but without limitation to equipment of the prior art.

The invention claimed is:

1. A hydraulic connector for the connection between two cylindrical bodies, the hydraulic connector comprising:
   jaws positioned and preloaded by an actuating hydraulic piston through a pressurization chamber, wherein the jaws include a plurality of teeth configured to increase a load capacity of the hydraulic connector;
   an unlocking pressurization chamber;
   an adjustment ring configured to regulate a locking pressure of the hydraulic connector;
   a bottom cap fixed to an external jacket, wherein the external jacket is fixed to the adjustment ring; and
   a tapering surface between the jaws and the adjustment ring,
   wherein the tapering surface is a surface of the jaws opposite the plurality of teeth.

2. The hydraulic connector according to claim 1, wherein the pressure chamber and the unlocking pressurization chamber are formed by sealing elements and the actuating hydraulic piston surrounded by the external jacket.

3. The hydraulic connector according to claim 1, wherein the actuating hydraulic piston has cylindrical faces.

4. The hydraulic connector according to claim 1, wherein the external jacket has hydraulic fluid lines.

5. The hydraulic connector according to claim 1, wherein the hydraulic connector is configured to have a positive locking characteristic and preload regulation system by means of the adjustment ring.

6. The hydraulic connector according to claim 1, wherein the hydraulic connector is configured to be used in subsea equipment for rigid connection of a wellhead, WCT, PLET, VCM, risers, and installation tools.

7. A method for performing a hydraulic connection, the process comprising:

an application of the hydraulic connector as defined in claim 1; and using parallel locking with regulation during assembly simultaneously with an application of a specified preload, wherein the specified preload being a hydraulic locking pressure.

8. The method according to claim 7, wherein the parallel locking of the hydraulic connector comprises the simultaneous application of the specified preload through a hydraulic fluid line, wherein the hydraulic fluid line pressurizes the pressurization chamber actuating the actuating hydraulic piston and forcing the actuating hydraulic piston in a vertical downward motion and causing cylindrical faces to interfere with the actuating hydraulic piston and the jaws, and moving the jaws in a radial direction in order to perform bonding among surfaces of the cylindrical bodies maintaining a preload force confined between contact surfaces and H4 profile.

9. The method according to claim 7, wherein, when an unlocking of the hydraulic connector is required, the unlocking comprises pressurization of the unlocking pressurization chamber by a hydraulic fluid line, in order to force the actuating hydraulic piston in an vertical upward motion and removing a load on the jaws, thus leading the jaws to move radially outward, back to an unlocked position.

10. The method according to claim 7, wherein the parallel locking requires regulation during assembly of the equipment assembly for adjusting preload which provides positive locking using the adjustment ring.

\* \* \* \* \*